US008164463B2

(12) United States Patent
Omi

(10) Patent No.: US 8,164,463 B2
(45) Date of Patent: Apr. 24, 2012

(54) DRIVER MANAGEMENT APPARATUS AND TRAVEL MANAGEMENT SYSTEM

(75) Inventor: Takuhiro Omi, Anjo (JP)

(73) Assignee: Denso Corporation, Kariya (JP)

( * ) Notice: Subject to any disclaimer, the term of this patent is extended or adjusted under 35 U.S.C. 154(b) by 399 days.

(21) Appl. No.: 12/449,027

(22) PCT Filed: Jan. 30, 2008

(86) PCT No.: PCT/JP2008/051377
§ 371 (c)(1),
(2), (4) Date: Jul. 21, 2009

(87) PCT Pub. No.: WO2008/093712
PCT Pub. Date: Aug. 7, 2008

(65) Prior Publication Data
US 2010/0090839 A1    Apr. 15, 2010

(30) Foreign Application Priority Data

Feb. 1, 2007    (JP) .................................. 2007-022809
Jan. 24, 2008   (JP) .................................. 2008-014248

(51) Int. Cl.
  *G08B 23/00*    (2006.01)
(52) U.S. Cl. ....................... 340/575; 180/272; 702/182
(58) Field of Classification Search .................. 340/575, 340/576, 439; 180/272; 382/118; 701/29, 701/28, 35; 702/182, 183, 188, 189
See application file for complete search history.

(56) References Cited

U.S. PATENT DOCUMENTS

| 6,580,973 | B2 * | 6/2003 | Leivian et al. ................. 701/1 |
| 6,704,434 | B1 | 3/2004 | Sakoh et al. |
| 6,909,947 | B2 * | 6/2005 | Douros et al. ................. 701/29 |
| 6,925,425 | B2 * | 8/2005 | Remboski et al. ............ 702/182 |
| 7,039,551 | B2 * | 5/2006 | Shu et al. ..................... 702/182 |
| 7,565,230 | B2 * | 7/2009 | Gardner et al. ............... 180/272 |
| 7,692,548 | B2 * | 4/2010 | Bonefas et al. ............... 340/575 |
| 7,902,693 | B2 * | 3/2011 | Hijikata et al. ............... 307/10.1 |
| 7,974,748 | B2 * | 7/2011 | Goerick et al. ................. 701/28 |

(Continued)

FOREIGN PATENT DOCUMENTS

JP    A-4-020192    1/1992

(Continued)

OTHER PUBLICATIONS

Office Action mailed on Apr. 5, 2011 in the corresponding Japanese Patent Application No. 2008-014248 (English translation enclosed).

(Continued)

*Primary Examiner* — John A Tweel, Jr.
(74) *Attorney, Agent, or Firm* — Posz Law Group, PLC

(57) ABSTRACT

In a driver management apparatus for managing the driver of a vehicle, a state estimating means estimates a state of the driver based on the sensing information from a sensing means Based on an estimation result, an extracting means extracts, as a capture region, part of the sensing information. The capture information storing means extracts the sensing information associated with the extracted capture region and stores the extracted sensing information as capture information. The determining means determines whether the estimation result satisfies a reporting condition. When it is determined that the estimation result satisfies the reporting condition, the controlling means retrieves the capture information associated with the estimation result and causes the retrieved capture information to be transmitted with the estimation result to the external center.

59 Claims, 9 Drawing Sheets

U.S. PATENT DOCUMENTS

| | | |
|---|---|---|
| 2002/0035422 A1 | 3/2002 | Sasaki |
| 2002/0091473 A1 | 7/2002 | Gardner et al. |
| 2002/0115423 A1 | 8/2002 | Hatae et al. |
| 2002/0116156 A1 | 8/2002 | Remboski et al. |
| 2002/0120371 A1 | 8/2002 | Leivian et al. |
| 2002/0120374 A1 | 8/2002 | Douros et al. |
| 2002/0151297 A1 | 10/2002 | Remboski et al. |

FOREIGN PATENT DOCUMENTS

| | | |
|---|---|---|
| JP | A-6-233306 | 8/1994 |
| JP | A-10-053165 | 2/1998 |
| JP | A-11-034688 | 2/1999 |
| JP | A-11-195198 | 7/1999 |
| JP | A-11-283194 | 10/1999 |
| JP | A-11-298940 | 10/1999 |
| JP | A-2001-018717 | 1/2001 |
| JP | A-2001-023090 | 1/2001 |
| JP | A-2001-045438 | 2/2001 |
| JP | A-2001-122163 | 5/2001 |
| JP | A-2001-126091 | 5/2001 |
| JP | A-2001-194161 | 7/2001 |
| JP | A-2002-074599 | 3/2002 |
| JP | A-2002-132898 | 5/2002 |
| JP | A-2004-110615 | 4/2004 |
| JP | A-2004-157880 | 6/2004 |
| JP | A-2005-348439 | 12/2005 |
| JP | A-2006-235732 | 9/2006 |
| JP | A-2007-048302 | 2/2007 |
| WO | WO 2006/075489 | 7/2006 |

OTHER PUBLICATIONS

Office Action dated Aug. 20, 2010 issued in corresponding CN application No. 200880003809.2 (English translation enclosed).

Office Action mailed on Jun. 28, 2011 in the corresponding Japanese patent application No. 2008-014248 (English translation enclosed).

International Search Report of the International Searching Authority for the corresponding International Application No. PCT/JP2008/051377 (English translation enclosed).

Written Opinion of International Searching Authority for corresponding International Application No. PCT/JP2008/051377 (English translation enclosed).

* cited by examiner

FIG. 3

SLEEPINESS LEVEL ESTIMATION

0: NOT SLEEPY AT ALL, 1: SLIGHTLY SLEEPY, 2: SLEEPY, 3: RELATIVELY SLEEPY, 4: VERY SLEEPY, 5: DOZING

SLEEPINESS LEVEL $D = a \times f1 + b \times f2 + c \times f3 + \ldots\ldots + z \times fn$ $a, b, c \ldots\ldots$ COEFFICIENTS
f1: BLINKING FACTOR 1 (FOR EXAMPLE, NUMBER OF BLINKS/MINUTE) FOR SLEEPINESS ESTIMATION
f2: BLINKING FACTOR 2 (FOR EXAMPLE, TOTAL CLOSED-EYE DURATION/MINUTE) FOR SLEEPINESS ESTIMATION
f3: BLINKING FACTOR 3 (FOR EXAMPLE, RATIO OF LONG BLINK) FOR SLEEPINESS ESTIMATION
  ...
fn: BLINKING FACTOR n (FOR EXAMPLE, NUMBER OF PIXELS BETWEEN UPPER AND LOWER EYELIDS) FOR SLEEPINESS ESTIMATION

SLEEPINESS LEVEL D(1) AT 1 MINUTE AFTER START =

| $a \times f1$ | $b \times f2$ | $c \times f3$ |
|---|---|---|
| 0.1 | 0.1 | 0 |

+ ......... +

| $z \times fn$ |
|---|
| 0 |

SLEEPINESS LEVEL D(2) AT 2 MINUTE AFTER START =

| 0.1 | 0.1 | 0.1 |
|---|---|---|

+ ......... +

| 0.1 |
|---|

...

SLEEPINESS LEVEL D(n) AT n MINUTE AFTER START =

| 0.3 | 1.8 | 0.3 |
|---|---|---|

+ ......... +

| 0.5 |
|---|

= 3.1 (RELATIVELY SLEEPY)

BACKGROUND REGION
(DOMAIN FOR IMAGE COMPRESSION)

FACE REGION
(NOT DOMAIN FOR IMAGE COMPRESSION)

BACKGROUND REGION
(TO BE DELETED OR MONOCHROMATIZED)

FACE REGION

BACKGROUND REGION
(IMAGE COMPRESSION RATE A)

FACE REGION
(IMAGE COMPRESSION RATE B)

FIRST EXAMPLE (RECORDING AFTER DELETION OF ALL)

SECOND EXAMPLE (OVERWRITTEN RECORDING)

DRIVER MANAGEMENT APPARATUS AND TRAVEL MANAGEMENT SYSTEM

CROSS REFERENCE TO RELATED APPLICATION

This application is a U.S. national stage application of PCT/JP2008/051377 filed on Jan. 30, 2008 and is based on and incorporates herein by reference Japanese Patent Application No. 2007-022809 filed on Feb. 1, 2007 and Japanese Patent Application No. 2008-014248 filed on Jan. 24, 2008.

TECHNICAL FIELD

The present invention relates to a travel management system for managing travel of a vehicle, and relates to a driver management apparatus for managing the driver of the vehicle. The driver management apparatus forms part of the travel management system.

BACKGROUND ART

A travel management system is known which manages travel of a vehicle properly with information exchanged between a driver management apparatus of the vehicle and a travel management center through communication between the apparatus and the center. A travel manager in the travel management center confirms the data on the driver and vehicle that are sent from the driver management apparatus to the travel management center. Then, the travel manager judges whether the state of the driver is normal or abnormal and issues instructions or a warning.

However, because the data on the driver and vehicle are sent only at preset times, countermeasures are taken late if, for example, the driver is likely to suddenly get ill.

Another travel management system (for example, refer to JP 2002-74599 A) includes a driver management apparatus, which includes a driver state determination unit. Based on physiological data (such as heart rate) of a driver, the determination unit determines whether the state of the driver is normal or not. If the determination unit determines that the state is abnormal, the unit transmits an image of a face of the driver (or the face image and the physiological data) to the management center. Based on the face image, the travel manager of the management center comprehensively judges situations, such as the state of the driver. Then, the manager gives instructions or commands to the driver.

An occupant face image processing system is known which can improve security by accurately acquiring information related to an occupant that drives the vehicle. The occupant face image processing system includes a face image acquiring means for acquiring an image of the face of the occupant, a converting means for converting data on the image into a data form for transmission, and a communication controlling means for transmitting the converted data to an on-road device and receiving instruction information for the acquisition of an image of the face from the on-road device (for example, refer to JP 2001-126091 A).

In the travel management system disclosed in JP 2002-74599 A, the driver management apparatus transmits a face image simultaneously with the determination, based on the state of the driver determined from his/her physiological data. However, the timing of photographing a face image is not specified. It is difficult for the travel manager of the travel management center to properly judge the driver's situation such as his/her state, based on only one face image.

In the occupant face image processing system disclosed in JP 2001-126091 A, an image of the face of the occupant is converted into a transmittable data form and transmitted. However, it is not specified what scene is cut out and transmitted. It is difficult for the travel manager in the travel management center to properly judge the situations, such as the state of the driver, based only on the cut-out face image.

DISCLOSURE OF THE INVENTION

In view of such problems, the object of the present invention is to determine a state of a driver of a vehicle more properly when managing travel of the vehicle.

In a first aspect of this disclosure, a driver management apparatus for managing a driver of a vehicle is capable of exchanging various data sets with an external center, and includes a sensing means, an information storing means, a state estimating means, an extracting means, a capture information storing means, a determining means, and a controlling means. The sensing means senses the driver. The sensing information storing means temporarily stores the sensing information that is a result of the sensing of the driver provided by the sensing means. The state estimating means estimates a state of the driver based on the sensing information. The extracting means extracts, as a capture region, part of the sensing information, which is stored by the sensing information storing means, based on an estimation result provided by the state estimating means. The capture information storing means extracts the sensing information, which is associated with the capture region extracted by the extracting means, from the sensing information storing means, and stores the extracted sensing information as capture information. The determining means determines whether the estimation result provided by the state estimating means satisfies a reporting condition for determining that the external center is to be informed of the estimation result. The controlling means retrieves the capture information, which is associated with the estimation result, from the capture information storing means, and causes the retrieved capture information to be transmitted with the estimation result to the external center when the determining means determines that the estimation result satisfies the reporting condition.

In a second aspect of this disclosure, a driver management apparatus for managing a driver of a vehicle is capable of exchanging various data sets with an external center and includes a sensing means, a sensing information storing means, a state estimating means, an extracting means, a capture information storing means, a determining means, a travel information storing means, and a controlling means. The sensing means senses the driver. The sensing information storing means temporarily stores the sensing information that is a result of the sensing of the driver provided by the sensing means. The state estimating means estimates a state of the driver based on the sensing information. The extracting means extracts, as a capture region, part of the sensing information, which is stored by the sensing information storing means, based on an estimation result provided by the state estimating means. The capture information storing means extracts the sensing information, which is associated with the capture region extracted by the extracting means, from the sensing information storing means, and stores the extracted sensing information as capture information. The determining means determines whether the estimation result provided by the state estimating means satisfies a reporting condition for determining that the external center is to be informed of the estimation result. The travel information storing means is capable of storing information related to travel of the vehicle.

The controlling means retrieves the capture information, which is associated with the estimation result, from the capture information storing means, and causes the travel information storing means to store the retrieved capture information with the estimation result when the determining means determines that the estimation result satisfies the reporting condition.

In a third aspect of this disclosure, a driver management apparatus for managing a driver of a vehicle is capable of exchanging various data sets with an external center, and includes a sensing means, a sensing information storing means, a face image acquiring means, a face image storing means, an extracting means, a capture information storing means, a determining means, and a controlling means. The sensing means senses bioinformation of the driver. The sensing information storing means temporarily stores sensing information that is a result of the sensing of the bioinformation of the driver provided by the sensing means. The state estimating means estimates a state of the driver based on the sensing information. The face image acquiring means acquires an image of a face of the driver. The face image storing means temporarily stores the acquired image of the face of the driver. The extracting means extracts, as a capture region, part of the face image, which is stored by the face image storing means, based on an estimation result provided by the state estimating means. The capture information storing means extracts at least one of the sensing information, which is associated with the capture region extracted by the extracting means, and the face image, which is associated with the capture region, and for storing, as capture information, the at least one of the sensing information and the face image. The determining means determines whether the estimation result provided by the state estimating means satisfies a reporting condition for determining that the external center is to be informed of the estimation result. The controlling means retrieves the capture information, which is associated with the estimation result, from the capture information storing means and causes the retrieved capture information to be transmitted with the estimation result to the external center when the determining means determines that the estimation result satisfies the reporting condition.

In a fourth aspect of this disclosure, a driver management apparatus for managing a driver of a vehicle is capable of exchanging various data sets with an external center and includes a sensing means, a sensing information storing means, a state estimating means, a face image acquiring means, a face image storing means, an extracting means, a capture information storing means, a determining means, a travel information storing means, and a controlling means. The sensing means senses bioinformation of the driver. The sensing information storing means temporarily storing senses information that is a result of the sensing of the bioinformation of the driver provided by the sensing means. The state estimating means estimates a state of the driver based on the sensing information. The face image acquiring means acquires an image of a face of the driver. The face image storing means temporarily stores the face image of the driver acquired by the face image acquiring means. Extracting means extracts, as a capture region, part of the face image, which is stored by the face image storing means, based on an estimation result provided by the state estimating means. The capture information storing means extracts at least one of the sensing information, which is associated with the capture region extracted by the extracting means, and the face image, which is associated with the capture region, and stores, as capture information, the at least one of the sensing information and the face image. The determining means determines whether the estimation result provided by the state estimating means satisfies a reporting condition for determining that the external center is to be informed of the estimation result. The travel information storing means is capable of storing information related to travel of the vehicle. The controlling means retrieves the capture information, which is associated with the estimation result, from the capture information storing means, and causes the travel information storing means to store the retrieved capture information with the estimation result when the determining means determines that the estimation result satisfies the reporting condition.

In a fifth aspect of this disclosure, a travel management system for managing travel of a vehicle includes a center and the above driver management apparatus. The center and the driver management apparatus are configured to exchange various data sets therebetween. The center includes an inputting means for receiving information provided from the driver management apparatus. The center includes a storing means for storing the received information.

BRIEF DESCRIPTION OF THE DRAWINGS

The foregoing and other objects, structures, and advantages of the present invention will become more apparent from the following detailed description with reference to the accompanying drawings, in which:

FIG. 3 is an explanatory drawing of the results of estimations of a sleepiness level D of the driver;

BEST MODES FOR CARRYING OUT THE INVENTION

Embodiments of the present invention will be described below with reference to the drawings.

[First Embodiment]

Figure 1:
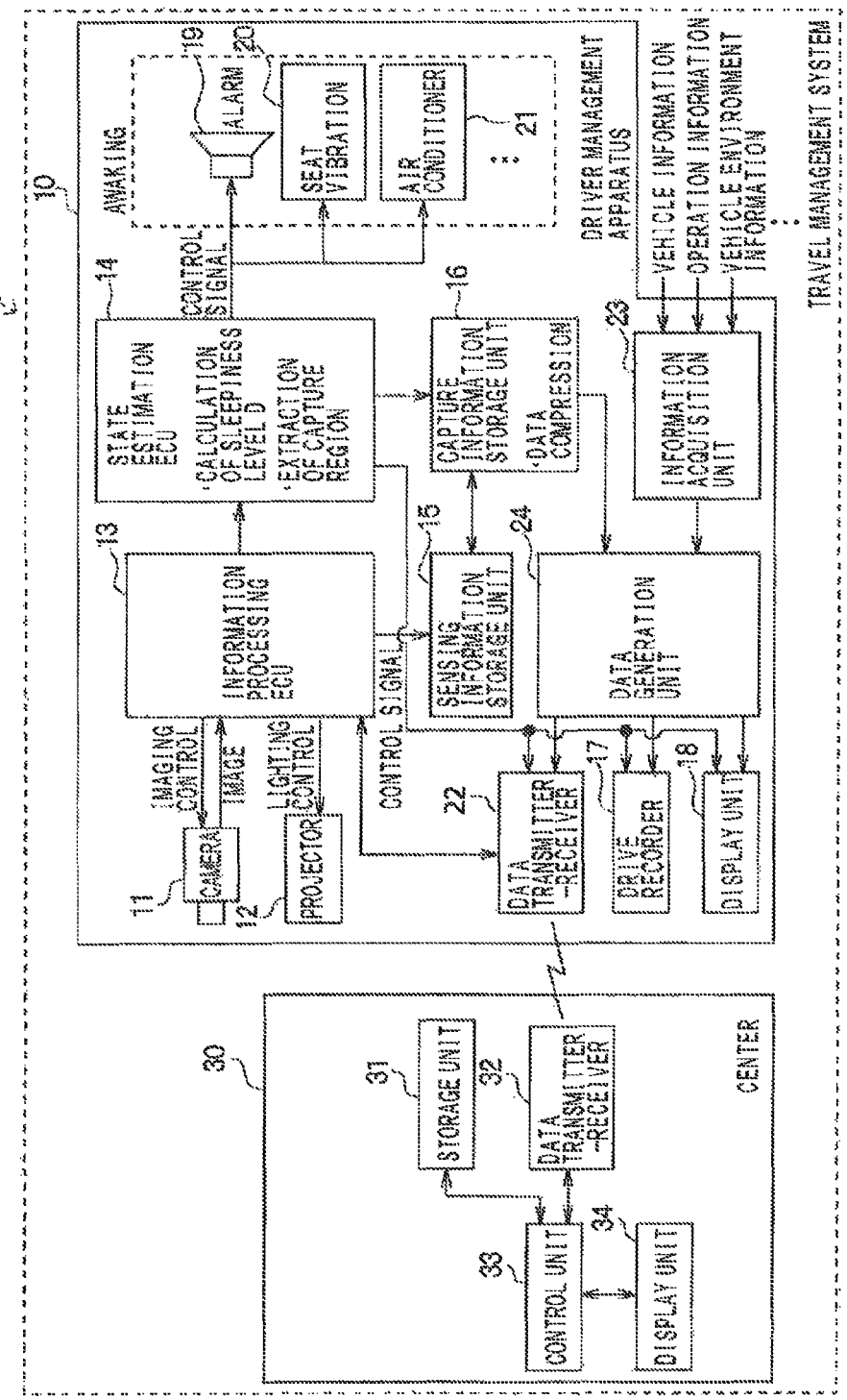
FIG. 1 is a schematic block diagram of a driver management system according to a first embodiment of the present invention.
Figure 2:
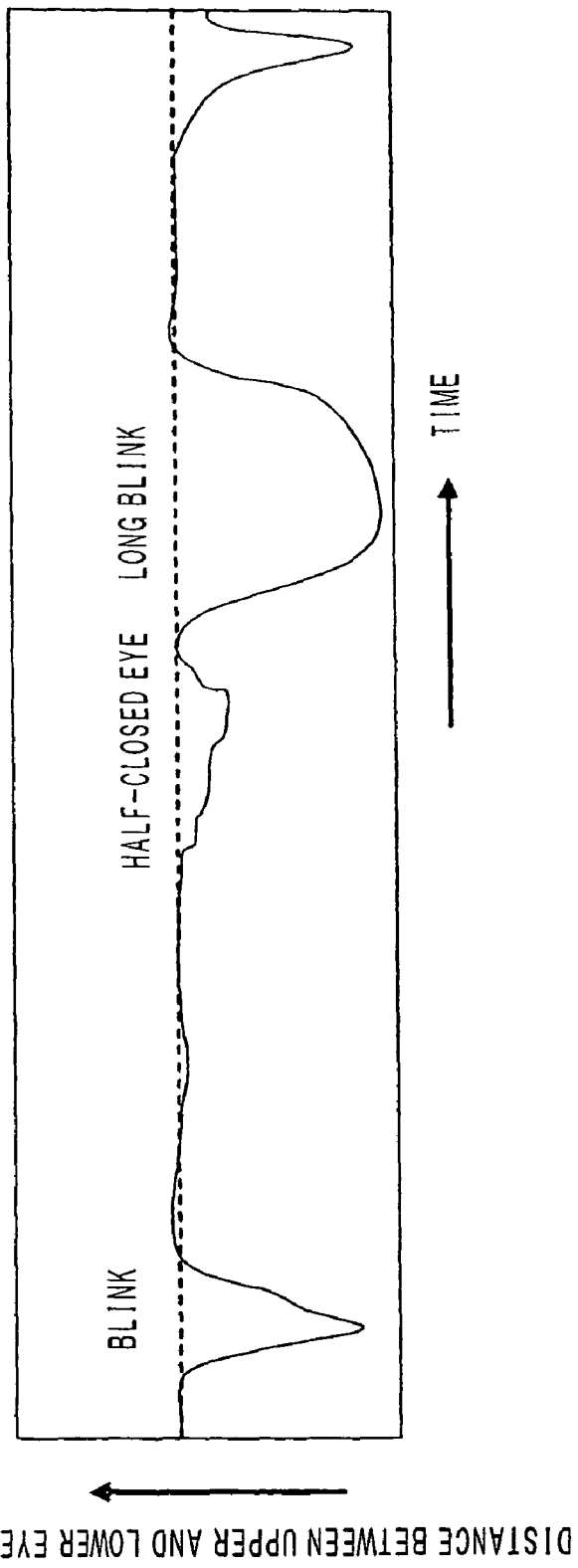
FIG. 2 is an explanatory drawing of a time variation in the distance between upper and lower lids of each eye of a driver, typically showing the variation as found when an image of a face of the driver has been processed.

FIG. 1 is a schematic block diagram of a travel management system 1 according to a first embodiment of the present invention. FIG. 2 is an explanatory drawing of a time variation in the distance between the upper and lower lids of each eye of the driver, typically showing the variation as found when an image of the face of the driver has been processed. FIG. 3 is an explanatory drawing of results of estimations of the driver's sleepiness level.

[Description of the Structure of Driver Management System 1]

As shown in FIG. 1, the travel management system 1 is a system for managing travel of a vehicle and includes a driver management apparatus 10 and a center 30, between which various data sets are exchangeable. The data transmission includes not only real time radio data transmission but also data transmission via portable memory devices or other hardware and wire data transmission.

[Description of the Structure of Driver Management Apparatus 10]

As shown in FIG. 1, the driver management apparatus 10 includes a camera 11, a projector 12, an information processing ECU 13, a state estimation ECU 14, a sensing information storage unit 15, a capture information storage unit 16, a drive recorder 17, a display unit 18, a speaker 19, a seat vibrator 20, an air conditioner 21, a data transmitter-receiver 22, an information acquisition unit 23, and a data generation unit 24.

The camera 11 has a photographic element and captures images of the face of the driver in the vehicle, in which the driver management apparatus 10 is mounted, such that the camera 11 sends the images to the information processing ECU 13.

The projector 12 is a means for lighting the face of the driver when the camera 11 captures the images of the face. For power saving and life lengthening, it is preferable that the projector 12 emits light synchronously only with the exposure time of the camera 11. In order not to dazzle the driver at night, it is preferable that the projector 12 emits near infrared or other invisible light.

The information processing ECU 13 receives the captured image from the camera 11, analyzes the received image, extracts a region containing the face of the driver in the image, detects face parts, such as the eyes, the nose, the mouth, in the region, analyzes the eyes in more detail so as to detect opening of the eyes including their blinking state, and sends the detection results to the state estimation ECU 14. The information processing ECU 13 also sends the captured image received from the camera 11 as sensing information to the sensing information storage unit 15.

Based on the processing results from the information processing ECU 13, the state estimation ECU 14 estimates mental and physical states of the driver, which may influence the driving of the vehicle. This ECU 14 extracts from the driver face image (sensing information) the capture region of the image where a phenomenon having great influence on the estimation exists. The ECU 14 sends the extracted capture region to the capture information storage unit 16. Based on information related to the capture region extraction, the capture information storage unit 16 takes the associated sensing information from the sensing information storage unit 15 and stores the associated sensing information as capture information. In the present embodiment, the state estimation ECU 14 estimates a sleepiness level D of the driver as the mental and physical state of the driver in each determination cycle (for example, every minute) through an algorithm which will be described later on. The sleepiness level D estimated as the mental and physical state of the driver corresponds to the estimation result in the appended claims. The state estimation ECU 14 sends the estimated sleepiness level D (estimation result) to the data generation unit 24.

The state estimation ECU 14 also sends control signals to the speaker 19, the seat vibrator 20, and the air conditioner 21 so as to control them.

The sensing information storage unit 15 temporarily stores the sensing information input into the information processing ECU 13. This storage unit 15 sends part of the stored sensing information as capture information to the capture information storage unit 16.

Based on the capture region extraction result extracted by the state estimation ECU 14, the capture information storage unit 16 takes the necessary sensing information from the sensing information storage unit 15. The capture information storage unit 16 uses the taken sensing information to be stored as capture information. Also, the capture information storage unit 16 compresses the data included in the capture information.

The information acquisition unit 23 acquires vehicle information, operation information, and vehicle environment information from the outside. The vehicle information is information related to the vehicle, such as information related to the behavior of the vehicle, information related to time. The behavior information may be information indicating the present position of the vehicle, information indicating the position of the vehicle relative to a traffic lane, information indicating the speed of the vehicle, or information indicating the attitude of the vehicle. The operation information indicates operation of the driver, such as information related to the steering angle of the vehicle, information related to braking, information related to accelerator operation, information related to horn operation, information related to the operation of the direction indicator or another projector of the vehicle, or information related to the operation of the air conditioner, the audio system or another system in the vehicle. The vehicle environment information is information related to the environment of the vehicle, such as information related to road environment, information related to a traffic jam, road works or another traffic condition, information related to the present weather, information related to a weather forecast, information related to illuminance, or information related to time or a time zone. Information on road environment may be acquired from the navigator or a camera of the vehicle. Information on a traffic jam, road works or another traffic condition may be acquired through communication with the camera of the vehicle or a device outside the vehicle such as a VICS. Information on the present weather may be acquired through communication with the rain sensor or another sensor of the vehicle or a device outside the vehicle such as a VICS. Information on a weather forecast may be acquired through communication with a device outside the vehicle such as a VICS. Information on illuminance may be acquired from the illuminance meter of the vehicle. Information on time or a time zone may be acquired from the clock of the vehicle.

The information acquisition unit 23 sends the acquired vehicle information, operation information and vehicle environment information to the data generation unit 24. Vehicle information, operation information, and vehicle environment information correspond to the additional information in the appended claims.

From the "estimation result" sent from the state estimation ECU 14 and the "capture information" sent from the capture information storage unit 16, the data generation unit 24 generates data for transmission to the center 30. If the information acquisition unit 23 sends "additional information"; the data for transmission is generated with the additional information added to it. The data generation unit 24 sends the generated data via the data transmitter-receiver 22 to the center 30. When there is no problem with the state of the driver based on the estimation result, only the result may be sent to the center 30. When there is a problem with the state of the driver based on the estimation result, the result and the capture information may be sent to the center 30. The capture information (for example, image data) and additional information (for example, character data) may be separately packaged and transmitted. Alternatively, an image having characters superimposed on image data may be generated and transmitted.

The data generation unit 24 also sends the drive recorder 17 and display unit 18 the data for transmission.

When the car has a traffic accident, or when the driver brakes suddenly or acts otherwise to avoid an accident, the drive recorder 17 records behavior data indicating the behavior (speed, shock) of the vehicle, operation data indicating the operation (steering, braking) of the occupant, or other data. The drive recorder 17 also records the data for transmission sent from the data generation unit 24.

The display unit 18 may be a liquid crystal display or an organic EL display. The display unit 18 displays, as an image, the estimation result, capture information or additional information included in the data for transmission sent from the data generation unit 24.

Based on the control signal from the state estimation ECU 14, the speaker 19 outputs various warning sounds and voices.

Based on the control signal from the state estimation ECU 14, the seat vibrator 20 vibrates the driver seat.

Based on the control signal from the state estimation ECU 14, the air conditioner 21 intakes air from the outside of the vehicle, heats or cools the air, and supplies the air into the vehicle, or heats or cools the air in the vehicle while circulating the air.

The data transmitter-receiver 22 communicates with the data transmitter-receiver 32 of the center 30.

The camera 11 and projector 12 correspond to the sensing means of the claims. The sensing information storage unit 15 corresponds to the sensing information storing means of the claims. The state estimation ECU 14 corresponds to the state estimating means, extracting means and determining means of the claims. The capture information storage unit 16 corresponds to the capture information storing means and data compressing means of the claims. The information acquisition unit 23 and data generation unit 24 correspond to the controlling means of the claims.

[Description of an Algorithm for Determining the Driver's Level of Sleepiness]

An algorithm for determining a level of sleepiness of the driver in real time uses various phenomena of the driver for calculation. The calculation may be based on the number of blinks (per minute), an eye closing time rate (seconds/minute), the opening of the eyes (%), and many other factors. FIG. 2 typically shows the time variation in the distance between the upper and lower lids of the eye of the driver. The variation is found when an image of the face of the driver has been processed. The downward peaks in the waveform represent blinks. The information related to blinks includes the duration of the blinks (from the time when the eyes are closed to the time when the eyes are opened), information related to a half-closed eye state, the number of blinks, and many other pieces of information. An estimation of sleepiness involves calculating a level by multiplying the above factors by weighting coefficients found experimentally. The sleepiness level D may be calculated according to the following equation 1, for example.

$$\text{sleepiness level } D = a \times f1 + b \times f2 + c \times f3 \ldots + z \times fn \quad \text{equation 1}$$

As shown in FIG. 3, the sleepiness level D is calculated by the summing of various factors. If a high value is observed in one of the above factors, the one raises the level D. While the sleepiness level D is estimated in real time or at regular intervals (for example, of one minute), the image is recorded temporarily in the sensing information storage unit 15. In other words, the image is recorded internally until the sleepiness level D is determined. After the determination, useless data (described later on) is deleted (always overwritten).

An image of a remarkable phenomenon that occurs when the sleepiness level D has exceeded a threshold is (compressed and) recorded as a factor in the sleepiness estimation, and the recorded image may be transmitted to the travel manager or recorded in the drive recorder. In the example of FIG. 3, the value of $b \times f2$ rises to predominance over the other values, and it is indicated that the above rising state has raised the sleepiness level D. Accordingly, the image is cut out based on the time stamp of the time, at which the value of $b \times f2$ indicates high. The time stamp corresponds to the capture region.

Consequently, even if the result of the sleepiness estimation is mere estimation, the remarkable phenomenon for the above estimation remains as incontestable evidence. This may act as a trigger for the driver to keep or improve tension of the driver while the driver is driving the vehicle. This may also act as a trigger for the driver to take a rest upon the command from the travel manager. The triggers contribute to preventive safety. By extracting the factor most influential on the sleepiness estimation instead of by recording or transmitting the images of the face of the driver at random, it is possible to make the memories and the transmit data efficient, to save time of the manager, and to keep the evidence of the phenomenon.

[Description of the Structure of Center 30]

As shown in FIG. 1, the center 30 includes a storage unit 31, a data transmitter/receiver 32, a control unit 33, and a display unit 34.

The storage unit 31 includes a nonvolatile memory and stores the face images and other data from the driver management apparatus 10.

The data transmitter/receiver 32 communicates with the data transmitter/receiver 22 of the driver management apparatus 10.

The display unit 34 may be a liquid crystal display or a CRT and displays various types of information as images.

The control unit 33 controls the units 31, 32 and 34 of the center 30. The control unit 33 causes the storage unit 31 to store the various types of information received by the data transmitter/receiver 32. Also, the control unit 33 causes the display unit 34 to display the various types of information received by the data transmitter/receiver 32.

[Description of Driver State Estimation Processing]

Figure 4:
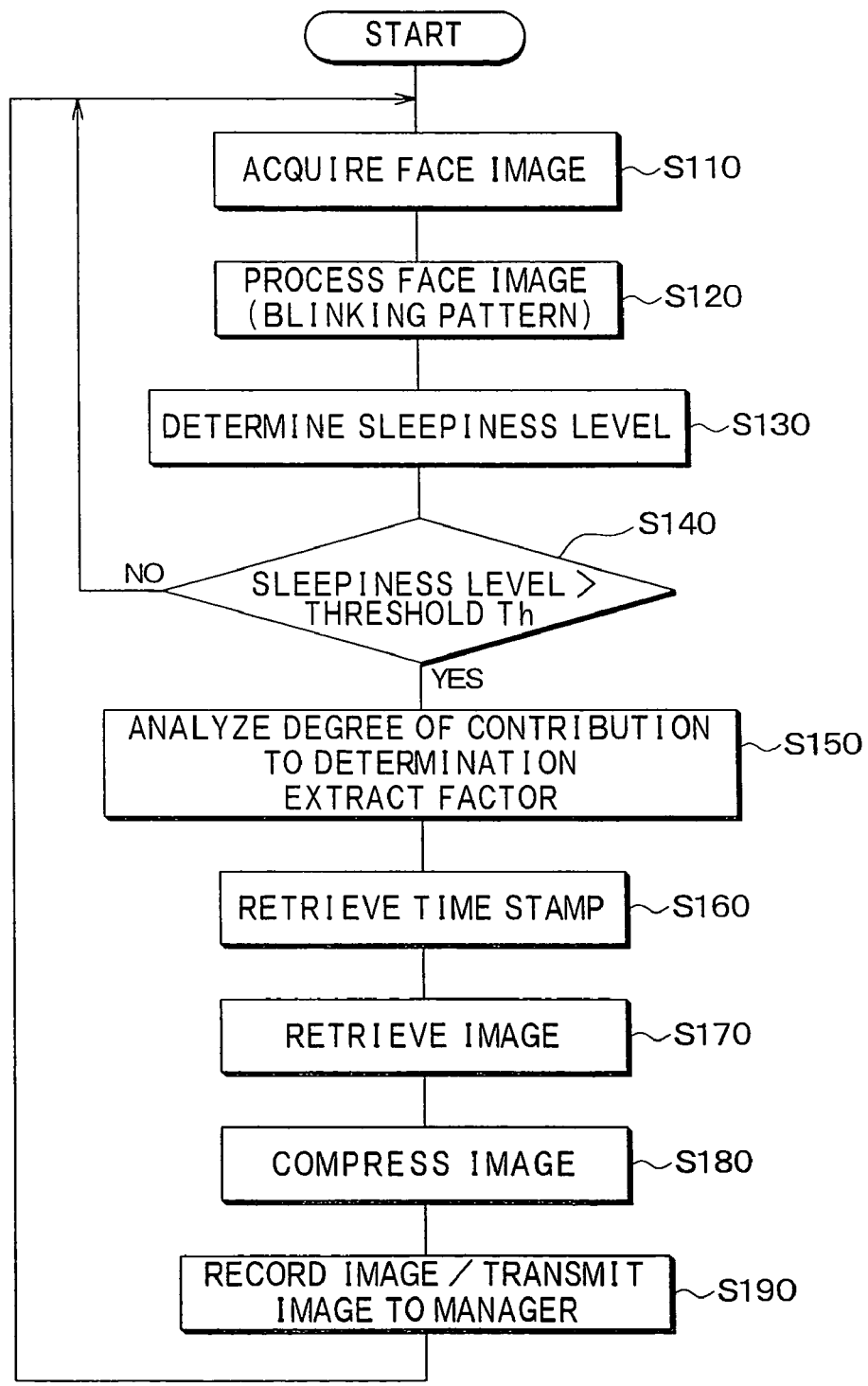
FIG. 4 is a flowchart of driver state estimation processing.

The driver state estimation processing performed by the driver management apparatus 10 will be described below with reference to the flowchart of FIG. 4. This processing is performed when the driver management apparatus 10 is switched on.

First, the driver management apparatus 10 acquires an image of the face of the driver as a dynamic image (S110). Specifically, the projector 12, which is fitted near the operational meters in the vehicle, lights up the face, and the camera 11 captures the image reflected by the face and sends the image to the information processing ECU 13, which receives the image from the camera 11.

Subsequently, the driver management apparatus 10 processes the face image from the camera 11 (S120). Specifically, the information processing ECU 13 analyzes the captured image received from the camera 11, locates the face of the driver in the image, detects the face parts in the image, determines the eyes in the detected face parts, and detects a blinking state of the eyes from the shape changes in the face parts where his/her eyelids are located (FIG. 2). Then, the information processing ECU 13 sends an extracted blinking pattern as a processing result to the state estimation ECU 14. The captured image is sent via the information processing ECU 13 to the sensing information storage unit 15 for temporary storage.

Subsequently, the driver management apparatus 10 determines the driver's sleepiness level (S130). Specifically, based on the blinking pattern from the information processing ECU 13, the state estimation ECU 14 estimates the driver's mental and physical states that may influence drive operation of the vehicle (FIG. 3). More specifically, because there is a clear difference between the blinking behavior of the driver exhibited when the driver is awake and the blinking behavior exhibited when the driver is sleepy, the driver management apparatus 10 determines the sleepiness level D through the foregoing algorithm based on the behavior change. The blinking behavior that varies as the driver gets sleepy includes distinctive patterns such as slow blinks and the half-closed eye state. The determination of the sleepiness level D involves experimentally finding and numerically formulating the correlation between each of the patterns and a sleepiness index based on a definition. Some methods for classifying sleepiness levels D have been proposed. For example, sleepiness levels D are often classified into about five stages, such as 0: not sleepy at all; 1: slightly sleepy; 2: sleepy; 3: relatively sleepy; 4: very sleepy; and 5: dozing.

Subsequently, the state estimation ECU 14 determines whether the sleepiness level D is higher than a threshold Th (S140). Specifically, the ECU 14 compares the sleepiness level D, which is found as described above, with the threshold Th, which is preset by the travel manager or someone else for taking action against the driver. When the sleepiness level D is higher than the threshold Th, the ECU 14 analyzes what blink feature in the equation has raised the level. When the ECU 14 determines that the sleepiness level D is not higher than the threshold Th (S140: no), the processing returns to S110.

Figure 6A:
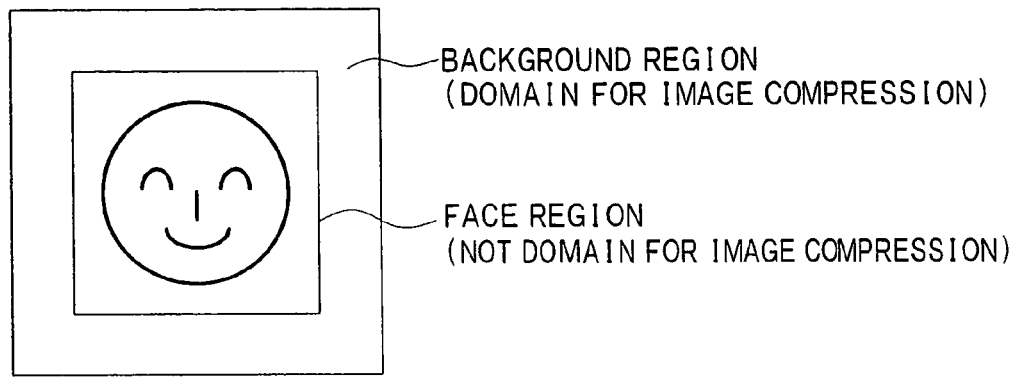
FIG. 6A is an explanatory drawing of face image compression.
Figure 6B:
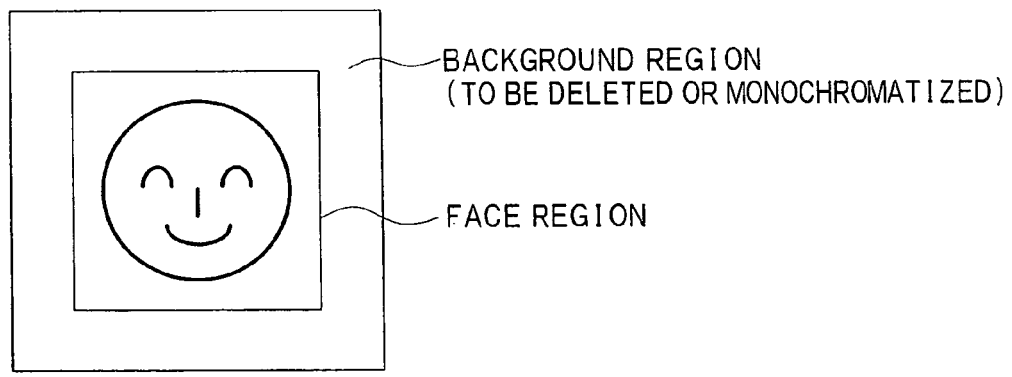
FIG. 6B is another explanatory drawing of the face image compression.
Figure 6C:
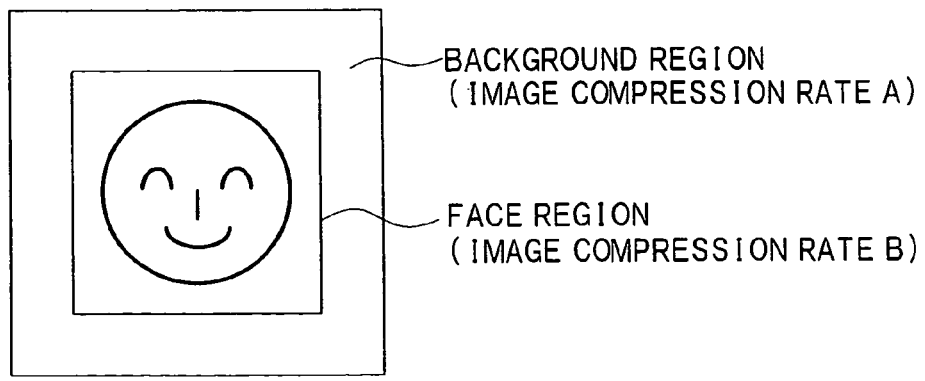
FIG. 6C is still another explanatory drawing of the face image compression.

When the state estimation ECU 14 determines that the sleepiness level D is higher than the threshold Th (S140: yes), the state estimation ECU 14 analyzes the degree of contribution to the determination and extracts the factor (S150). In other words, in a case, where the characteristic pattern shown when the driver gets sleepy is known in advance, the sleepiness estimation algorithm may be customized for the driver. In this case, as is the case with S150, the ECU 14 extracts the factor based on the function of the driver with regard to the degree of contribution to the determination. In order to eliminate errors in the estimation results between individuals, the estimation logic may be changed during the process, and thereby the weighting coefficients changes accordingly. The ECU 14 analyzes the degree of contribution always with the changed coefficients. The ECU 14 analyzes what blink feature in the equation has raised the sleepiness level D. If the result of this analysis is long closing of the driver's eyes, the ECU 14 extracts a time stamp, as a capture region, where an image clearly showing the long closing is recorded (S160). Based on the extracted capture region, the image is taken from the sensing information storage unit 15 and then stored as a piece of capture information in the capture information storage unit 16. According to need, the data generation unit 24 retrieves the piece of capture information from the capture information storage unit 16 (S170). By transmitting the retrieved capture information via the data transmitter/receiver 22 to the travel manager or recording the retrieved capture information in the driver recorder 17 or the like, the driver management apparatus 10 aims to keep the driver moderately tense. However, because of limitation by image recording capacity and data delivery capacity, it may be necessary to reduce the amount of data. Therefore, in order to limit the capture information to a preset capacity, the capture information storage unit 16 performs image compression for the information according to need (S180). The image compression may be performed by one of the following methods. (1) The storage unit 16 greatly compresses all or part of the background and leaves the face region as it is (FIG. 6A). In order to recognize the outline of the face of the driver during image processing, the face region of the driver is set to include an area around the face of the driver. (2) The storage unit 16 completely deletes the background and cuts out only the face region as it is (FIG. 6B). Alternatively, part of the background might be deleted. (3) The storage unit 16 compresses the face region and the background at different rates. Specifically, the storage unit 16 compresses the face region at a rate B lower than a rate A, at which the storage unit 16 compresses the background (FIG. 6C). (4) The storage unit 16 monochromatizes all or part of the background (makes all or part of the background black or white) and leaves the face region as it is (FIG. 6B). If there is no particular limitation, the above compression is not required. If there is more capacity left, images around the time stamp may not be cut, but images for five seconds including the scene may be uniformly captured. The data generation unit 24 generates data for transmission from the compressed capture information, the estimation result, and additional information, transmits the data to the center 30, and records the data in the driver recorder 17 (S190).

The data included in the capture information may be compressed when the capture information storage unit 16 stores the capture information. Specifically, when the storage unit 16 stores the capture information taken from the sensing information according to the capture region, the data included in the capture information may be compressed. Otherwise, when the controlling means transmits the capture information, or when the drive recorder 17 stores the capture information, the data included in the capture information may be compressed.

[Description of Image Storage Processing]

Figure 5:
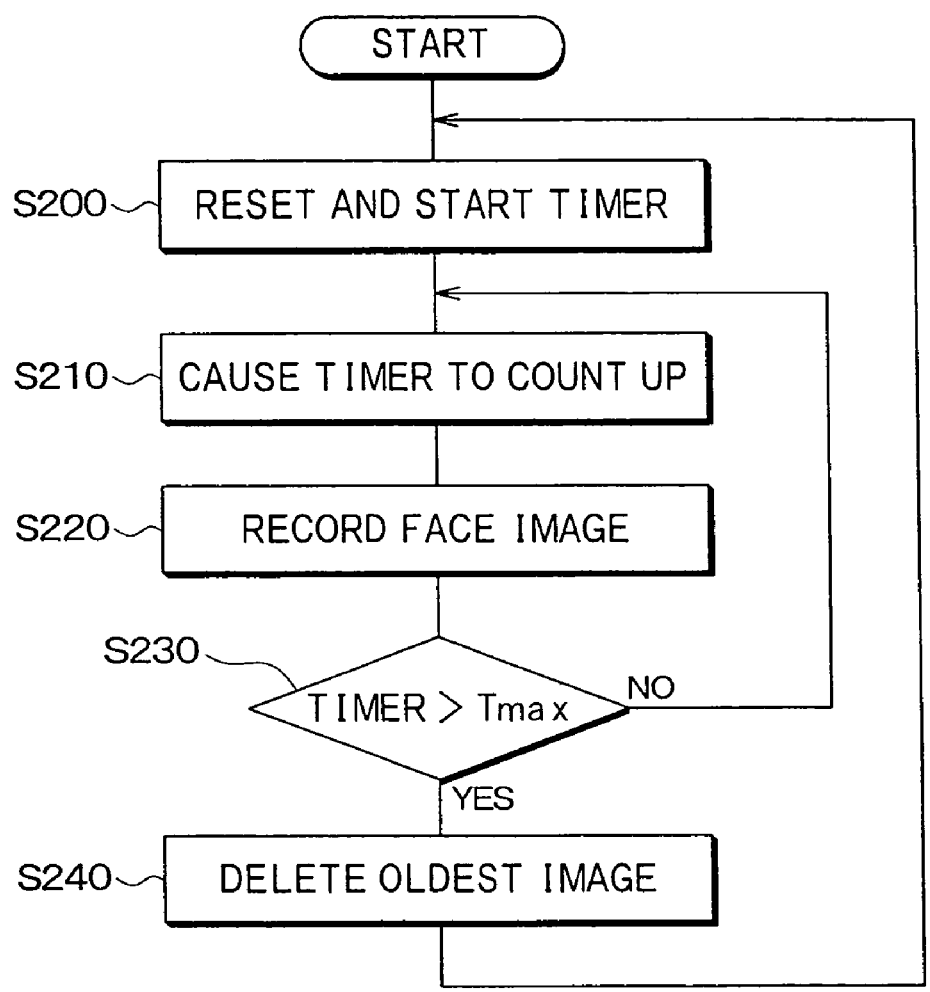
FIG. 5 is a flowchart of image storage processing.

The image storage processing performed by the driver management apparatus 10 will be described below with reference to the flowchart of FIG. 5. This processing is performed independently of the driver state estimation processing when the driver management apparatus 10 is switched on.

First, the information processing ECU 13 resets and starts the timer (S200). Next, the information processing ECU 13 causes the timer to count up (S210). Next, the sensing information storage unit 15 records a face image from the information processing ECU 13 (S220). Next, the information processing ECU 13 determines whether the number counted by the timer is larger than Tmax (S230). If the ECU 13 determines that the counted number is not larger than Tmax (S230: no), the processing returns to S210. If the ECU 13 determines that the counted number is larger than Tmax (S230: yes), the sensing information storage unit 15 deletes the oldest one of the recorded face images (S240). Then, the processing returns to S200.

Figure 9A:
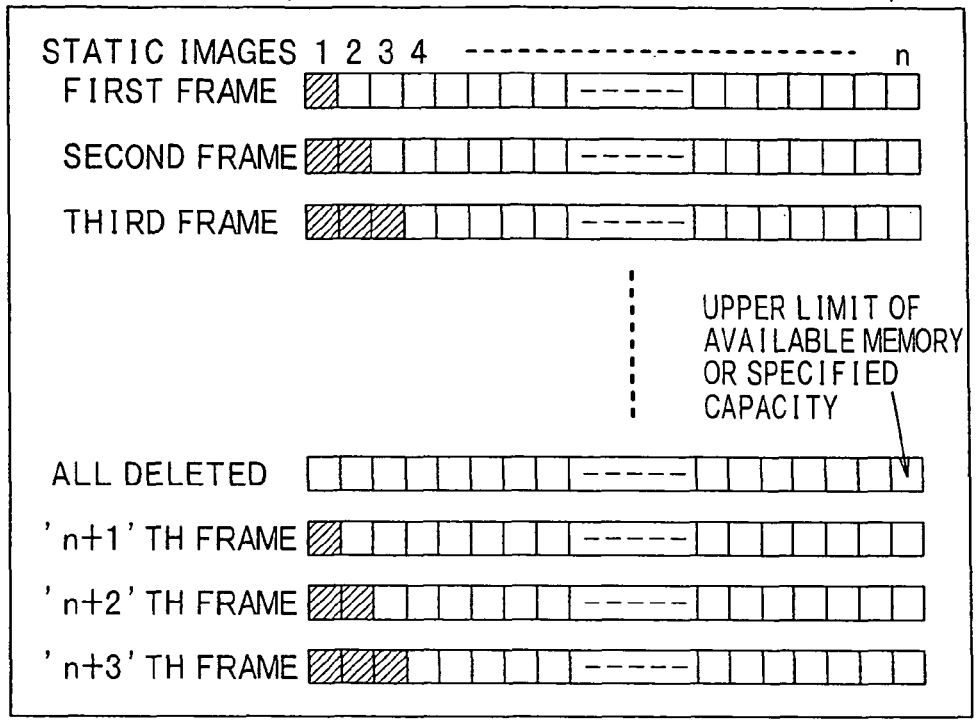
FIG. 9A is a first explanatory drawing of the image storage processing.
Figure 9B:
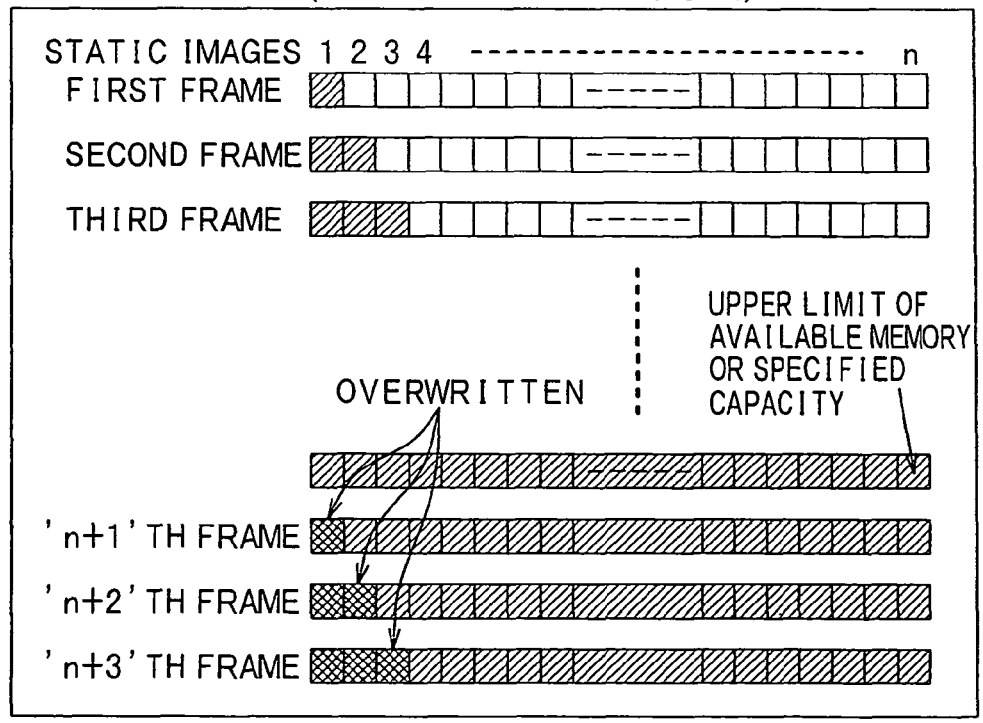
FIG. 9B is a second explanatory drawing of the image storage processing.

The image storage processing involves acquiring new images in sequence beyond the capacity of the sensing information storage unit 15. As shown at the first example in FIG. 9A, the image storage processing involves discarding all of the old images stored in the sensing information storage unit 15 and recording new images. Alternatively, as shown at the second example in FIG. 9B, the frames of the images in the sensing information storage unit 15 might be overwritten one by one.

The driver state estimation processing and the image storage processing may be performed while the driver management apparatus 10 is energized. The estimation processing and the storage processing may be performed not only while the vehicle is driven but also before the vehicle starts to be driven. The performance may be started by the driver's operation. The performance may be started when a door of the vehicle is unlocked, opened, or closed. The performance may be started when the driver sits on the driver seat, or when the ignition switch is turned on.

[Effects of the First Embodiment]

(1) The travel management system 1 according to the first embodiment achieves the following effects. The driver state estimation processing performed by the driver management apparatus 10 includes the steps of acquiring an image of the face of the driver as a dynamic image (S110), processes the acquired image (S120), and subsequently determines the sleepiness level D of the driver based on the processed image (S130). If the state estimation ECU 14 determines that the sleepiness level D is higher than the threshold Th (S140: yes), the state estimation ECU 14 analyzes the degree of contribution to the determination and extracts the factor (S150). The ECU 14 analyzes what blink feature has raised the sleepiness level D. If the result of this analysis is long closing of the driver's eyes, the ECU 14 extracts the time stamp, as a capture region, where the image clearly showing the long closing is recorded (S160). The image associated with the extracted capture region is stored as the capture information and is retrieved according to need (S170). According to need, the retrieved image is compressed to be limited to the preset capacity (S180). Data for transmission is generated from the compressed capture information, the estimation result, and the additional information, transmitted to the center 30, and recorded in the driver recorder 17 (S190). In the center 30, the received image may be stored in the storage unit 31 or displayed on the display unit 34.

The travel manager in the center 30 is capable of comprehensively judging the state of the driver by considering the estimation result and the capture information transmitted from the driver management apparatus 10. This makes it possible to determine the state of the driver of the vehicle more adequately and utilize them for driver management, future driver training, etc.

Electromagnetic interference or the like may prevent driver state estimation results based on sensing information and capture information from being transmitted or delivered to the center. Even in the above case, the center may collect the estimation results and the capture information after the end of the travel of the vehicle. The manager of the center 30 is capable of comprehensively judging the state of the driver by considering the collected results and information transmitted from the driver management apparatus 10. This makes it possible to determine the state of the driver of the vehicle more adequately and utilize them for driver management, future driver training, etc.

(2) The driver management apparatus 10 of the first embodiment compresses an image according to need so as to limit the image to the preset capacity (S180) and transmits the compressed image to the center 30. This makes it possible to reduce the data amount of capture information, although the quality of the image of the face region is kept from deteriorating. The face region is essential to visually estimating the state of the driver. Accordingly, it is possible to reduce the capacity of the capture information storage unit 16, which is necessary for the storage of capture information, and the drive recorder 17. It is also possible to reduce the load exerted when the data generation unit 24 transmits estimation results and capture information.

(3) At S120 of the driver state estimation processing, the driver management apparatus 10 of the first embodiment analyzes the captured image received from the camera 11, locates the face of the driver in the image, detects the face parts in the image, determines the eyes of the driver in the detected face parts, and detects a blinking state of the eyes based on the shape changes of the eyelids in the face parts. The information processing ECU 13 extracts a blinking pattern from the detected blinking state (FIG. 2). In other words, the face image is so edited or processed that parts showing the state of the driver are extracted from the image. The edited or processed information is transmitted to the center 30, which reports it so that the travel manager can more adequately judge the state of the driver.

(4) If the information acquisition unit 23 of the driver management apparatus 10 according to the first embodiment sends out "additional information", the driver management apparatus 10 transmits estimation result and the capture information to the center 30 and records the estimation result and the capture information in the drive recorder, together with the additional information. The manager of the center 30 is capable of comprehensively judging the state of the driver by considering the additional information in addition to the estimation result and the capture information transmitted from the driver management apparatus 10. This makes it possible to judge the state of the driver of the vehicle more adequately and utilize them for driver management, future driver training, etc.

[Second Embodiment]

Figure 7:
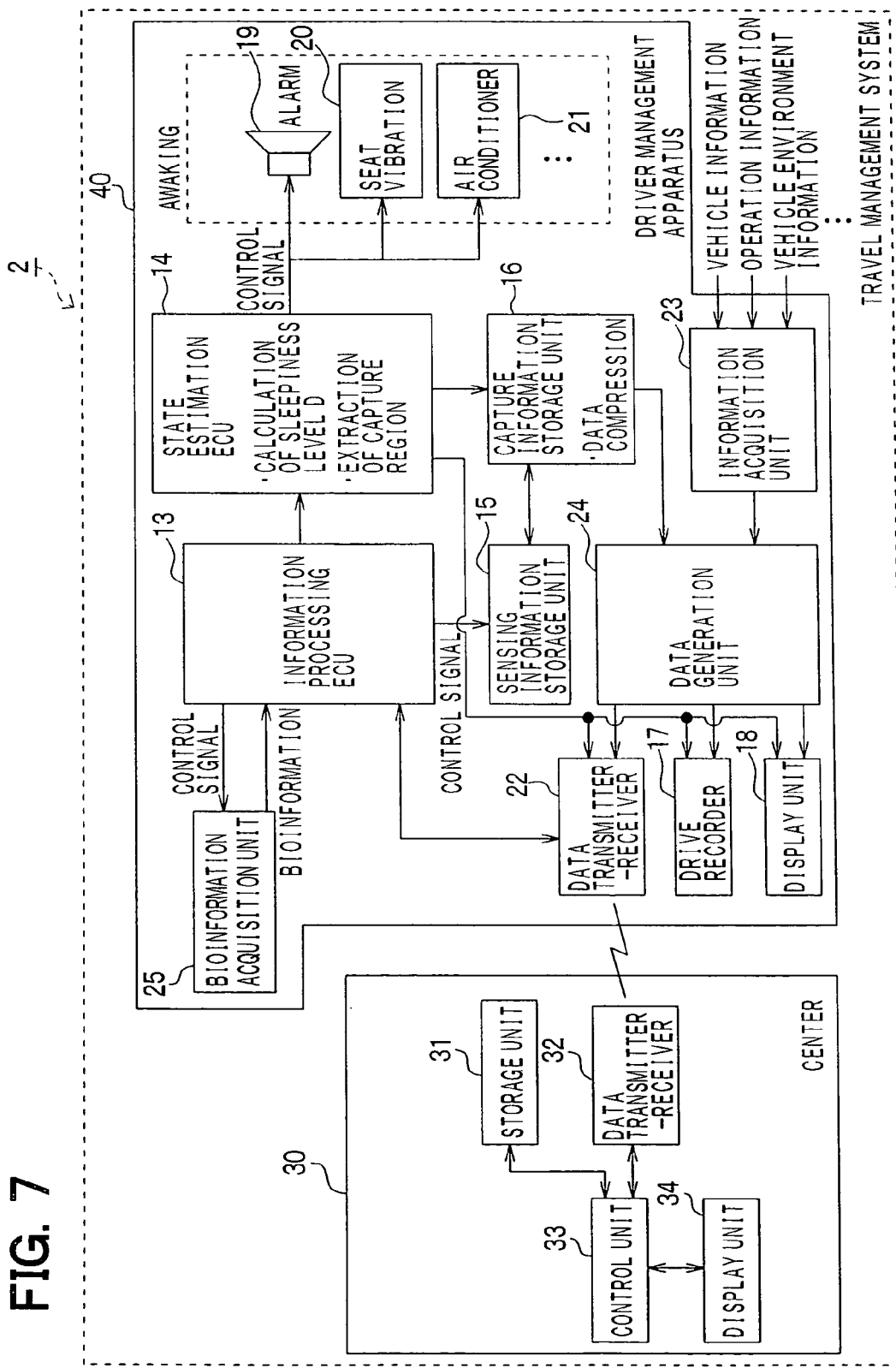
FIG. 7 is a schematic block diagram of a driver management system according to a second embodiment of the present invention.

FIG. 7 is a schematic block diagram of a travel management system 2 according to a second embodiment of the present invention.

A description will be provided below of a case where an electrocardiogram, blood pressure, pulse waves, breathing, and/or the like of the driver is sensed.

As shown in FIG. 7, the travel management system 2 according to the present embodiment includes a driver management apparatus 40. This apparatus 40 includes a bioinformation acquisition unit 25, the information processing ECU 13, the state estimation ECU 14, the sensing information storage unit 15, the capture information storage unit 16, the drive recorder 17, the display unit 18, the speaker 19, the seat vibrator 20, the air conditioner 21, the data transmitter-receiver 22, the information acquisition unit 23, and the data generation unit 24.

The bioinformation acquisition unit 25 acquires bioinformation of the driver and senses the state of the driver from the bioinformation. The bioinformation may be information related to the driver's electrocardiogram, blood pressure, pulse waves, breathing, or the like. The bioinformation acquisition unit 25 acquires, as the bioinformation of the driver, at least one of information related to the electrocardiogram, information related to the blood pressure, information related to the pulse waves, and information related to the breathing. The information processing ECU 13 analyzes the bioinformation received from the bioinformation acquisition unit 25, sends the processing result to the state estimation ECU 14, and also sends the sensed bioinformation through the information processing ECU 13 to the sensing information storage unit 15. Based on the processing result provided by the information processing ECU 13, the state estimation ECU 14 estimates a mental and physical state of the driver, which may influence the driving of the vehicle. From the processing result, this ECU 14 extracts, as a capture region, a region where a phenomenon that greatly influences the estimation exists. The ECU 14 sends the extracted capture region to the capture information storage unit 16. Based on the extraction result provided by the state estimation ECU 14, the capture information storage unit 16 takes the capture information from the sensing information storage unit 15 and stores it.

From the "estimation result" sent from the state estimation ECU 14 and the "capture information" sent from the capture information storage unit 16, the data generation unit 24 generates data for transmission to the center 30. In a case, where there is "additional information" that is sent by the information acquisition unit 23, the above data for transmission to the center 30 is generated by adding the additional information thereto. The data generation unit 24 sends the generated data via the data transmitter-receiver 22 to the center 30. When there is no problem with the state of the driver based on the estimation result, only the result may be sent to the center 30. When there is a problem with the state of the driver based on the estimation result, the result and the capture information may be sent to the center 30. The data generation unit 24 also sends to the drive recorder 17 and display unit 18 the data for transmission.

The manager of the center 30 is capable of comprehensively judging the state of the driver by considering the capture information and the estimation result, which is based on the driver's electrocardiogram, blood pressure, pulse waves, and breathing, transmitted from the driver management apparatus 40. This makes it possible to judge the state of the driver of the vehicle more adequately and utilize them for driver management, future driver training, etc.

[Third Embodiment]

Figure 8:
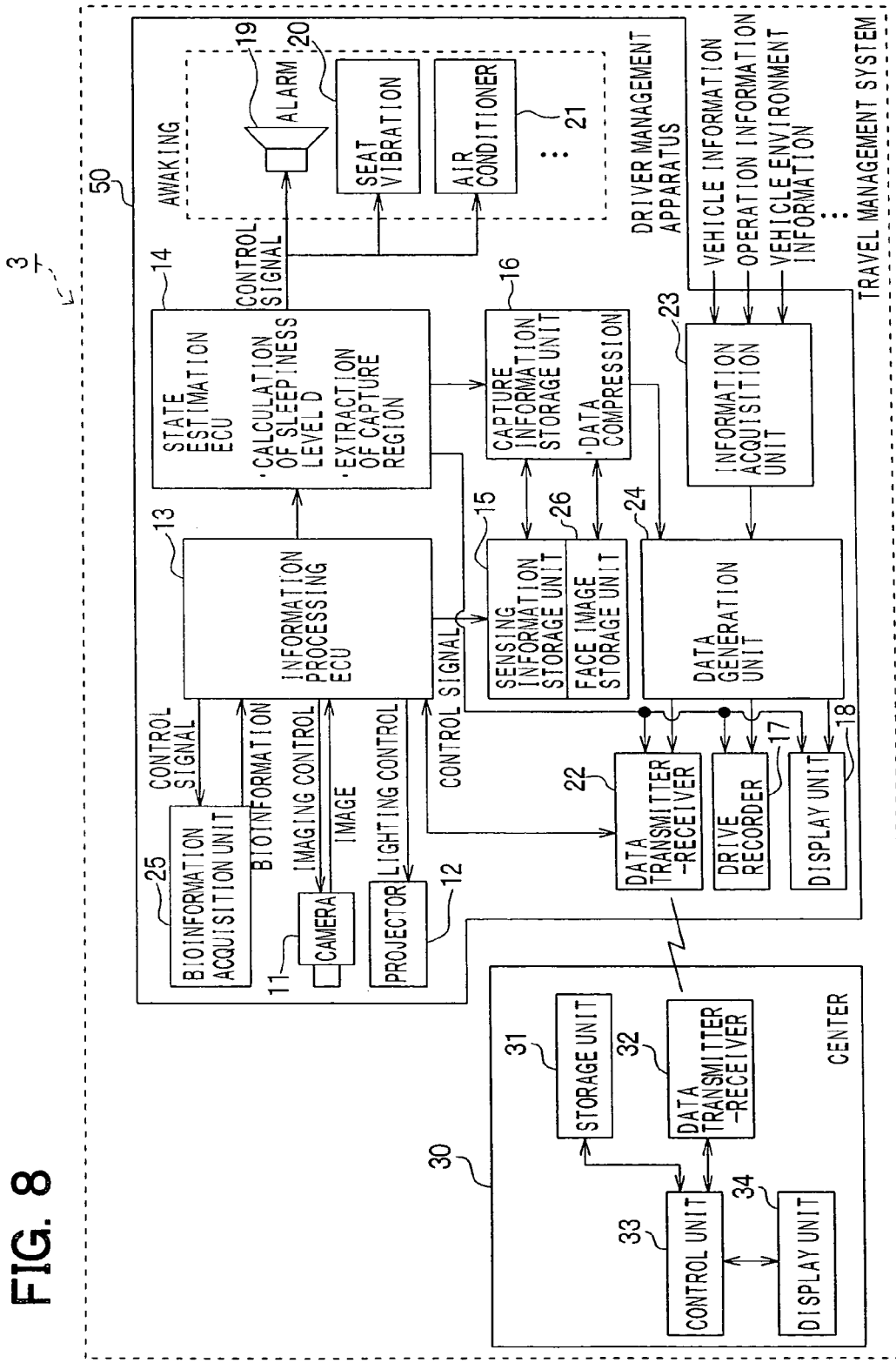
FIG. 8 is a schematic block diagram of a driver management system according to a third embodiment of the present invention.

FIG. 8 is a schematic block diagram of a travel management system 3 according to a third embodiment of the present invention.

A description will be provided below of a case where the electrocardiogram, blood pressure, pulse waves, breathing, and/or the like of the driver is sensed, and where capture information is extracted from an image of the face of the driver.

As shown in FIG. 8, the travel management system 3 according to the present embodiment includes a driver management apparatus 50. This apparatus 50 includes the camera 11, the projector 12, the bioinformation acquisition unit 25, the information processing ECU 13, the state estimation ECU 14, the sensing information storage unit 15, the face image storage unit 26, the capture information storage unit 16, the drive recorder 17, the display unit 18, the speaker 19, the seat vibrator 20, the air conditioner 21, the data transmitter-receiver 22, the information acquisition unit 23, and the data generation unit 24.

The bioinformation acquisition unit 25 acquires the bioinformation of the driver and senses the state of the driver from the bioinformation. The bioinformation may be information related to the electrocardiogram, the blood pressure, the pulse waves, the breathing, or the like of the driver. The bioinformation acquisition unit 25 acquires, as the bioinformation of the driver, at least one of information related to the electrocardiogram, information related to the blood pressure, information related to the pulse waves, and information related to the breathing.

The camera 11 acquires the image of the face of the driver and sends the image via the information processing ECU 13 to the face image storage unit 26 for temporary storage.

The information processing ECU 13 analyzes the bioinformation received from the bioinformation acquisition unit 25 and sends the processing result to the state estimation ECU 14. The bioinformation acquisition unit 25 sends the bioinformation via the information processing ECU 13 to the sensing information storage unit 15 for temporary storage.

The face image storage unit 26 temporarily stores the face image from the camera 11.

Based on the processing result provided by the information processing ECU 13, the state estimation ECU 14 estimates mental and physical states of the driver, which may influence the driving of the vehicle. This ECU 14 extracts, as a capture region, a region where a phenomenon having great influence on the estimation exists. Based on the result of the extraction of the capture region detected by the ECU 14, the capture information storage unit 16 extracts the capture information from at least one of the sensing information stored in the sensing information storage unit 15 and the face image stored in the face image storage unit 26. The capture information storage unit 16 stores the extracted capture information.

From the "estimation result" sent from the state estimation ECU 14 and the "capture information" sent from the capture information storage unit 16, the data generation unit 24 generates data for transmission to the center 30. When there is "additional information" sent by the information acquisition unit 23, the above data for transmission to the center 30 is generated by adding the additional information thereto. The data generation unit 24 sends the generated data via the data transmitter-receiver 22 to the center 30. When there is no problem with the state of the driver based on the estimation result, only the result may be sent to the center 30. When there is a problem with the state of the driver based on the estimation result, the result and the capture information may be sent to the center 30. The data generation unit 24 also sends the data for transmission to the drive recorder 17 and the display unit 18.

The manager of the center is capable of comprehensively judging the state of the driver by considering the estimation results and capture information transmitted from the driver management apparatus. This makes it possible to judge the state of the driver of the vehicle more adequately and utilize them for driver management, future driver training, etc.

Electromagnetic interference or the like may prevent the estimation result of the state of the driver based on the sensing information and the capture information from being transmitted or delivered to the center. Even in such a case, the center may collect the estimation results and the capture information after the end of the travel of the vehicle. The manager of the center 30 is capable of comprehensively judging the state of the driver by considering the collected results and information transmitted from the driver management apparatus 10. This makes it possible to judge the state of the driver of the vehicle more adequately and utilize them for driver management, future driver training, etc.

[Other Embodiments]

Hereinbefore, one embodiment of the present invention has been described. The invention is not limited to the present embodiment but may be embodied in the following forms.

(1) At S110 of the driver state estimation processing of the foregoing embodiment, an image of the face of the driver is acquired as a dynamic image. However, it is not essential that the dynamic image be recorded or delivered. It is essential that the travel manager be able to visually understand the state in which the driver was. For example, one or more static images may be recorded or delivered. Needless to say, a dynamic image is good for the representation of blinks. However, even a static image or a series of multiple static images may be able to show the driver dozing with neck muscles relaxing.

(2) The driver state estimation processing of the foregoing embodiment includes the step of carrying out a determination every minute. If a phenomenon as evidence of sleepiness occurs between determinations, determination timing is waited for. However, it may be effective to cut out an image and transmit it to the travel manager or do otherwise in real time every time the sleepiness estimation algorithm determines that the driver is dozing or otherwise in an urgent state.

(3) In the driver state estimation processing of the foregoing embodiment, if it is estimated that the driver is sleepy based on a combination of phenomena, two or more images may be captured and transmitted. Because the phenomena occur at different times, if similar phenomena occur often, a representative may be selected from the similar phenomena.

(4) The driver may be able to confirm the recorded images. For the protection of private information, the driver may be given the right to refuse the transmission and/or recording of images. Specifically, an image may be transmitted and/or recorded only if the driver agrees. The driver's agreement may be confirmed in advance, periodically, or at a time when an image is transmitted and/or recorded. In order for the travel manager to know that, it is preferable to leave records of the driver's confirmation, deletion, etc. of images. The driver may be able to decide whether to delete the image or not by examining the recorded images after the images have been once recorded.

(5) In the driver state estimation processing of the foregoing embodiment, the threshold Th may be changed. Alternatively, two or more thresholds Th may be set for the driver state estimation processing. The threshold Th may be changed remotely via the data transmitter/receiver 22.

(6) The foregoing embodiment is described with reference to sleepiness. What is detected is not limited in particular and may be careless driving, drunkenness, tiredness, or the driver's unsafe state or bad physical state. What is detected is not limited to images and may be an electrocardiogram, heartbeat, or pulse waves. If an abnormality or the like is forecast while something is monitored, a typical image or signal directly showing the abnormality or the like may be extracted and sent.

(7) In the foregoing embodiment, the state of the driver are estimated from an image of his/her face. The state of the driver may be estimated from the image of the posture of the driver, or from the electrocardiogram of the driver, the blood pressure of the driver, the pulse waves of the driver, the breathing of the driver, the characteristic operation or characteristic manner of the driver. With respect to the image of the face of the driver, the state of the driver is estimated from the blink in the foregoing embodiment, but the state of the driver may be estimated based on a facial expression of the driver or based on the manner, in which the driver moves the hand to the face. With respect to the image of the posture of the driver, the state of the driver may be estimated from the manner in which the driver sits.

(8) At S140 of the driver state estimation processing of the foregoing embodiment, the reporting condition on which the results of estimations of the state of the driver determine that the center 30 should be informed of the sensing information is that the driver be sleepy. More specifically, the reporting condition is that the sleepiness level D be higher than the threshold Th. The reporting condition may be that the driver be driving carelessly, drunk or tired, that the center should request the transmission of the estimation result and the capture information, that the driver should want to transmit the estimation result and the capture information to the center, that it be determined that it is preferable to transmit the estimation result and the capture information to the center based on the environment of the vehicle or the driver's biorhythm, that the present time be a preset time, at which the estimation result and the capture information are required to be transmitted to the center, or that the present position of the vehicle corresponds to a preset location, where the estimation result and the capture information are required to be transmitted to the center.

The environment of the vehicle may be the time when the vehicle is started, the time for the traffic jam, the time when the vehicle enters into an expressway, or a time zone such as daytime or nighttime. The biorhythm may be set with a circadian rhythm, a circasemi-dian rhythm or the like for the driver's life pattern and the travel status taken into account. The preset time for the transmission of the estimation result and the capture information to the center may be set at predetermined time intervals or at predetermined distances. The preset place where the transmission of the estimation result and the capture information to the center is requested may be set as a check point by the manager of the center for a daily service in a certain section. The preset place is effective because the manager may want to monitor the time when the vehicle passes through the check point, the road environment at that time, or the state of the driver at that time. The preset place may be detected by a GPS or a DSRC (ETC).

When the sleepiness level is not higher than the threshold Th, it may be necessary to send out the estimation result and the capture information in response to a request from the center 30. Therefore, even when the sleepiness level D is equal to or lower than the threshold Th, capture regions clearly indicating the state of the driver should always be extracted.

(9) In the determination of the sleepiness level D, the number of blinks may be the dominant factor lifting the level. In this case, the conditions for selecting the image to be cut out are changed according to the sleepiness level D. The number of blinks (blinking intervals) does not have a positive correlation with the sleepiness level D, but it is statistically evident that the number increases or decreases with the level. Accordingly, it is effective to so select an image as to extract the feature that conforms most with the sleepiness level D and transmit it to the center 30.

(10) The foregoing embodiment is described with reference to an example of image compression processing. Similar compression processing is effective for the reduction of data capacity for electrocardiographic waveform or other biosensing information.

The invention claimed is:

1. A driver management apparatus for managing a driver of a vehicle, the apparatus being capable of exchanging various data sets with an external center, the apparatus comprising:
   a sensing means for sensing the driver;
   a sensing information storing means for temporarily storing the sensing information that is a result of the sensing of the driver provided by the sensing means;
   a state estimating means for estimating a state of the driver based on the sensing information;
   an extracting means for extracting, as a capture region, part of the sensing information, which is stored by the sensing information storing means, based on an estimation result provided by the state estimating means;
   a capture information storing means for extracting the sensing information, which is associated with the capture region extracted by the extracting means, from the sensing information storing means, and for storing the extracted sensing information as capture information;
   a determining means for determining whether the estimation result provided by the state estimating means satisfies a reporting condition for determining that the external center is to be informed of the estimation result; and a controlling means for retrieving the capture information, which is associated with the estimation result, from the capture information storing means, and for causing the retrieved capture information to be transmitted with the estimation result to the external center when the determining means determines that the estimation result satisfies the reporting condition.

2. The driver management apparatus according to claim 1, wherein the controlling means causes the estimation result and the capture information to be transmitted with additional information to the external center.

3. The driver management apparatus according to claim 2, wherein:
   the controlling means is capable of acquiring vehicle information related to the vehicle; and
   the controlling means causes the estimation result and the capture information to be transmitted with the acquired vehicle information, which serves as the additional information, to the external center.

4. The driver management apparatus according to claim 2, wherein:
   the controlling means is capable of acquiring operation information indicating operation of the driver; and
   the controlling means causes the estimation result and the capture information to be transmitted with the acquired operation information, which serves as the additional information, to the external center.

5. The driver management apparatus according to claim 2, wherein:
   the controlling means is capable of acquiring vehicle environment information related to a situation of an environment of the vehicle; and
   the controlling means causes the estimation result and the capture information to be transmitted with the acquired environment information, which serves as the additional information, to the external center.

6. The driver management apparatus according to claim 1, wherein the sensing means acquires bioinformation of the driver and senses the driver based on the acquired bioinformation.

7. The driver management apparatus according to claim 1, wherein the sensing means acquires an image of a face of the driver and senses the driver based on the acquired image.

8. The driver management apparatus according to claim 7, wherein the sensing means acquires the face image of the driver as a dynamic image or a series of a plurality of static images.

9. The driver management apparatus according to claim 1, wherein the capture region is a region, in which a phenomenon having great influence on estimating the state of the driver exists.

10. The driver management apparatus according to claim 1, wherein the reporting condition includes that the driver is sleepy.

11. The driver management apparatus according to claim 1, wherein the reporting condition includes that the driver drives carelessly.

12. The driver management apparatus according to claim 1, wherein the reporting condition includes that the driver is drunk.

13. The driver management apparatus according to claim 1, wherein the reporting condition includes that the driver is tired.

14. The driver management apparatus according to claim 1, wherein the reporting condition includes that the external center requests that the estimation result and the capture information are transmitted thereto.

15. The driver management apparatus according to claim 1, wherein the reporting condition includes that the driver wants to transmit the estimation result and the capture information to the external center.

16. The driver management apparatus according to claim 1, wherein the reporting condition includes that it is determined preferable that the estimation result and the capture information are transmitted to the external center based on a situation of an environment of the vehicle.

17. The driver management apparatus according to claim 1, wherein the reporting condition includes that it is determined preferable that the estimation result and the capture information are transmitted to the external center based on a biorhythm of the driver.

18. The driver management apparatus according to claim 1, wherein the reporting condition includes that a present time is a preset time, at which the estimation result and the capture information are required to be transmitted to the external center.

19. The driver management apparatus according to claim 1, wherein the reporting condition includes that a location of the vehicle corresponds to a preset point, where the estimation result and the capture information are required to be transmitted to the external center.

20. A travel management system for managing travel of a vehicle, the system comprising:
    a center; and
    the driver management apparatus according to claim 1, wherein:
    the center and the driver management apparatus are configured to exchange various data sets therebetween;
    the center includes an inputting means for receiving information provided from the driver management apparatus; and
    the center includes a storing means for storing the received information.

21. The travel management system according to claim 20, wherein the center further includes a reporting means for retrieving the information stored in the storing means and for reporting the same.

22. A driver management apparatus for managing a driver of a vehicle, the apparatus being capable of exchanging various data sets with an external center, the apparatus comprising:
    a sensing means for sensing the driver;
    a sensing information storing means for temporarily storing the sensing information that is a result of the sensing of the driver provided by the sensing means;
    a state estimating means for estimating a state of the driver based on the sensing information;
    an extracting means for extracting, as a capture region, part of the sensing information, which is stored by the sensing information storing means, based on an estimation result provided by the state estimating means;
    a capture information storing means for extracting the sensing information, which is associated with the capture region extracted by the extracting means, from the sensing information storing means, and for storing the extracted sensing information as capture information;
    a determining means for determining whether the estimation result provided by the state estimating means satisfies a reporting condition for determining that the external center is to be informed of the estimation result;
    a travel information storing means capable of storing information related to travel of the vehicle; and
    a controlling means for retrieving the capture information, which is associated with the estimation result, from the capture information storing means, and for causing the travel information storing means to store the retrieved capture information with the estimation result when the determining means determines that the estimation result satisfies the reporting condition.

23. The driver management apparatus according to claim 22, wherein the controlling means causes the travel information storing means to store the estimation result and the capture information with additional information.

24. The driver management apparatus according to claim 23, wherein:
the controlling means is capable of acquiring vehicle information related to the vehicle; and
the controlling means causes the travel information storing means to store the estimation result and the capture information with the acquired vehicle information, which serves as the additional information.

25. The driver management apparatus according to claim 23, wherein:
the controlling means is capable of acquiring operation information indicating operation of the driver; and
the controlling means causes the travel information storing means to store the estimation result and the capture information with the acquired operation information, which serves as the additional information.

26. The driver management apparatus according to claim 23, wherein:
the controlling means is capable of acquiring vehicle environment information related to an environment of the vehicle; and
the controlling means causes the travel information storing means to store the estimation result and the capture information with the acquired environment information, which serves as the additional information.

27. The driver management apparatus according to claim 22, wherein the sensing means acquires bioinformation of the driver and senses the driver based on the acquired bioinformation.

28. The driver management apparatus according to claim 22, wherein the sensing means acquires an image of a face of the driver and senses the driver based on the acquired image.

29. The driver management apparatus according to claim 28, wherein the sensing means acquires the face image of the driver as a dynamic image or a series of a plurality of static images.

30. The driver management apparatus according to claim 22, wherein the capture region is a region, in which a phenomenon having great influence on estimating the state of the driver exists.

31. The driver management apparatus according to claim 22, wherein the reporting condition includes that the driver is sleepy.

32. The driver management apparatus according to claim 22, wherein the reporting condition includes that the driver drives carelessly.

33. The driver management apparatus according to claim 22, wherein the reporting condition includes that the driver is drunk.

34. The driver management apparatus according to claim 22, wherein the reporting condition includes that the driver is tired.

35. The driver management apparatus according to claim 22, wherein the reporting condition includes that the external center requests that the estimation result and the capture information are transmitted thereto.

36. The driver management apparatus according to claim 22, wherein the reporting condition includes that the driver wants to transmit the estimation result and the capture information to the external center.

37. The driver management apparatus according to claim 22, wherein the reporting condition includes that it is determined preferable that the estimation result and the capture information are transmitted to the external center based on a situation of an environment of the vehicle.

38. The driver management apparatus according to claim 22, wherein the reporting condition includes that it is determined preferable that the estimation result and the capture information are transmitted to the external center based on a biorhythm of the driver.

39. The driver management apparatus according to claim 22, wherein the reporting condition includes that a present time is a preset time, at which the estimation result and the capture information are required to be transmitted to the external center.

40. The driver management apparatus according to claim 22, wherein the reporting condition includes that a location of the vehicle corresponds to a preset point, where the estimation result and the capture information are required to be transmitted to the external center.

41. A travel management system for managing travel of a vehicle, the system comprising:
a center; and
the driver management apparatus according to claim 22, wherein:
the center and the driver management apparatus are configured to exchange various data sets therebetween;
the center includes an inputting means for receiving information provided from the driver management apparatus; and
the center includes a storing means for storing the received information.

42. The travel management system according to claim 41, wherein the center further includes a reporting means for retrieving the information stored in the storing means and for reporting the same.

43. A driver management apparatus for managing a driver of a vehicle, the apparatus being capable of exchanging various data sets with an external center, the apparatus comprising:
a sensing means for sensing bioinformation of the driver;
a sensing information storing means for temporarily storing sensing information that is a result of the sensing of the bioinformation of the driver provided by the sensing means;
a state estimating means for estimating a state of the driver based on the sensing information;
a face image acquiring means for acquiring an image of a face of the driver;
a face image storing means for temporarily storing the acquired image of the face of the driver;
an extracting means for extracting, as a capture region, part of the face image, which is stored by the face image storing means, based on an estimation result provided by the state estimating means;
a capture information storing means for extracting at least one of the sensing information, which is associated with the capture region extracted by the extracting means, and the face image, which is associated with the capture region, and for storing, as capture information, the at least one of the sensing information and the face image;
a determining means for determining whether the estimation result provided by the state estimating means satisfies a reporting condition for determining that the external center is to be informed of the estimation result; and a controlling means for retrieving the capture information, which is associated with the estimation result, from the capture information storing means and for causing the retrieved capture information to be transmitted with the estimation result to the external center when the determining means determines that the estimation result satisfies the reporting condition.

44. The driver management apparatus according to claim 43, wherein the controlling means causes the estimation result and the capture information to be transmitted with additional information to the external center.

45. The driver management apparatus according to claim 44, wherein:
the controlling means is capable of acquiring vehicle information related to the vehicle; and
the controlling means causes the estimation result and the capture information to be transmitted with the acquired vehicle information, which serves as the additional information, to the external center.

46. The driver management apparatus according to claim 44, wherein:
the controlling means is capable of acquiring operation information indicating operation of the driver; and
the controlling means causes the estimation result and the capture information to be transmitted with the acquired operation information, which serves as the additional information, to the external center.

47. The driver management apparatus according to claim 44, wherein:
the controlling means is capable of acquiring vehicle environment information related to a situation of an environment of the vehicle; and
the controlling means causes the estimation result and the capture information to be transmitted with the acquired environment information, which serves as the additional information, to the external center.

48. The driver management apparatus according to claim 43, wherein the face image acquiring means acquires the face image as a dynamic image or a series of a plurality of static images.

49. The driver management apparatus according to claim 43, further comprising a data compressing means for compressing data included in the capture information.

50. The driver management apparatus according to claim 49, wherein the data compressing means compresses the data included in the capture information when the capture information is stored in the capture information storing means.

51. The driver management apparatus according to claim 49, wherein:
when the capture information includes an image, the data compressing means discriminates a region other than a region of a face of the driver in the image; and
the data compressing means only compresses all or part of the discriminated region.

52. The driver management apparatus according to claim 49, wherein:
when the capture information includes an image, the data compressing means discriminates a region other than a region of a face of the driver in the image; and
the data compressing means deletes all or part of the discriminated region.

53. The driver management apparatus according to claim 49, wherein:
when the capture information includes an image, the data compressing means discriminates a region other than a region of a face of the driver in the image; and
the data compressing means monochromatizes all or part of the discriminated region.

54. The driver management apparatus according to claim 49, wherein:
when the capture information includes an image, the data compressing means discriminates a region of a face of the driver in the image; and
the data compressing means compresses the region of the face and a region other than the region of the face at different compressing rates.

55. A driver management apparatus for managing a driver of a vehicle, the apparatus being capable of exchanging various data sets with an external center, the apparatus comprising:
a sensing means for sensing bioinformation of the driver;
a sensing information storing means for temporarily storing sensing information that is a result of the sensing of the bioinformation of the driver provided by the sensing means;
a state estimating means for estimating a state of the driver based on the sensing information;
a face image acquiring means for acquiring an image of a face of the driver;
a face image storing means for temporarily storing the face image of the driver acquired by the face image acquiring means;
an extracting means for extracting, as a capture region, part of the face image, which is stored by the face image storing means, based on an estimation result provided by the state estimating means;
a capture information storing means for extracting at least one of the sensing information, which is associated with the capture region extracted by the extracting means, and the face image, which is associated with the capture region, and for storing, as capture information, the at least one of the sensing information and the face image;
a determining means for determining whether the estimation result provided by the state estimating means satisfies a reporting condition for determining that the external center is to be informed of the estimation result;
a travel information storing means capable of storing information related to travel of the vehicle; and
a controlling means for retrieving the capture information, which is associated with the estimation result, from the capture information storing means, and for causing the travel information storing means to store the retrieved capture information with the estimation result when the determining means determines that the estimation result satisfies the reporting condition.

56. The driver management apparatus according to claim 55, wherein the controlling means causes the travel information storing means to store the estimation result and the capture information with additional information.

57. The driver management apparatus according to claim 56, wherein:
the controlling means is capable of acquiring vehicle information related to the vehicle; and
the controlling means causes the travel information storing means to store the estimation result and the capture information with the acquired vehicle information, which serves as the additional information.

58. The driver management apparatus according to claim 56, wherein:

the controlling means is capable of acquiring operation information indicating operation of the driver; and the controlling means causes the travel information storing means to store the estimation result and the capture information with the acquired operation information, which serves as the additional information.

59. The driver management apparatus according to claim 56, wherein:

the controlling means is capable of acquiring vehicle environment information related to a situation of an environment of the vehicle; and the controlling means causes the travel information storing means to store the estimation result and the capture information with the acquired environment information, which serves as the additional information.

* * * * *